United States Patent [19]

Brandin

[11] Patent Number: 5,706,144
[45] Date of Patent: *Jan. 6, 1998

[54] METHODS AND APPARATUS FOR AUTOMATING THE ADJUSTMENT OF REARVIEW MIRRORS

[76] Inventor: Bertil A. Brandin, 1001 Bay Street, Apt. 1216, Toronto, Ontario, Canada, M5S 3A6

[*] Notice: The term of this patent shall not extend beyond the expiration date of Pat. No. 5,694,259.

[21] Appl. No.: 475,910

[22] Filed: Jun. 7, 1995

Related U.S. Application Data

[63] Continuation-in-part of Ser. No. 370,753, Jan. 10, 1995, abandoned, which is a continuation-in-part of Ser. No. 348,092, Nov. 25, 1994, abandoned.

[51] Int. Cl.⁶ ............................................ B60R 1/08
[52] U.S. Cl. .................... 359/843; 359/877; 359/900; 307/10.1; 364/424.05
[58] Field of Search ....................... 359/843, 877, 359/900; 307/10.1; 318/568.1, 568.13, 568.16, 568.19, 568.21; 348/118, 135, 139, 148, 164; 364/424.05

[56] References Cited

U.S. PATENT DOCUMENTS

| | | | |
|---|---|---|---|
| 4,267,494 | 5/1981 | Matsuoka et al. | 318/568 |
| 4,544,871 | 10/1985 | Suzuki | 318/568 |
| 4,682,088 | 7/1987 | Sullivan | 318/568 |
| 4,689,537 | 8/1987 | Mizuta et al. | 318/568 |
| 4,707,788 | 11/1987 | Tashiro et al. | 364/424 |
| 4,798,967 | 1/1989 | Yamana et al. | 307/10 R |
| 4,811,226 | 3/1989 | Shinohara | 364/424.05 |
| 4,834,522 | 5/1989 | Janowicz | 359/877 |
| 4,971,430 | 11/1990 | Lynas | 359/843 |
| 5,008,603 | 4/1991 | Nakayama et al. | 318/568.1 |
| 5,064,274 | 11/1991 | Alten | 359/604 |
| 5,097,362 | 3/1992 | Lynas | 359/843 |
| 5,159,497 | 10/1992 | Lynas | 359/843 |
| 5,196,965 | 3/1993 | Lang et al. | 359/841 |
| 5,343,333 | 8/1994 | Nagayama et al. | 359/874 |
| 5,429,083 | 7/1995 | Doughtie et al. | 359/843 |

FOREIGN PATENT DOCUMENTS

| | | | |
|---|---|---|---|
| 02274848 | 7/1988 | European Pat. Off. | 359/877 |
| 287993 | 10/1988 | European Pat. Off. | B60R 16/02 |
| 0490734 | 6/1992 | European Pat. Off. | 359/877 |
| 3406286 | 8/1985 | Germany | B60R 1/02 |
| 58-53537 | 3/1983 | Japan | 359/877 |
| 58-89433 | 5/1983 | Japan | 359/877 |
| 58-206441 | 12/1983 | Japan | B60R 1/06 |

(List continued on next page.)

OTHER PUBLICATIONS

Japanese Patent Publication No. 2-234858 (Publication Date: Sep. 18, 1990).
Japanese Patent Publication No. 59-230838 (Publication Date: Dec. 25, 1984).

*Primary Examiner*—Paul D. Dzierzynski
*Assistant Examiner*—John Juba, Jr.
*Attorney, Agent, or Firm*—Timothy J. Sinnott; Bereskin & Parr

[57] ABSTRACT

Methods and apparatus for automating the orientation of a selected mirror mounted on a vehicle. The apparatus includes location apparatus for sensing the location of the driver's eyes, a computer controller, and a mirror positioning mechanism. The location apparatus may include various types of distance sensors and orientation detectors. The controller determines the desired orientation of the selected mirror based upon the position of the driver's eyes, known vehicle parameters and vision parameters, and generates control signals. The mirror positioning mechanism receives the control signals and positions the mirror in response thereto. The subject method includes the steps of determining the coordinates of the eyes of an individual using the mirror, determining the desired orientation of the mirror based upon these coordinates and the center point of the mirror and the reflected sightline vector, and then adjusting the orientation of one or more selected mirrors to enable the individual to see a pre-selected reflected sightline.

12 Claims, 9 Drawing Sheets

FOREIGN PATENT DOCUMENTS

| | | | |
|---|---|---|---|
| 60-157939 | 8/1985 | Japan | B60R 1/06 |
| 61-268534 | 11/1986 | Japan | B60K 35/00 |
| 62-31540 | 2/1987 | Japan | B60R 1/02 |
| 62-234754 | 10/1987 | Japan | B60R 1/06 |
| 62-286855 | 12/1987 | Japan | B60R 1/06 |
| 2-106452 | 4/1990 | Japan | B60R 1/02 |
| 2-293229 | 12/1990 | Japan | B60R 1/02 |
| 3-153432 | 7/1991 | Japan | B60R 1/02 |
| 3-284435 | 12/1991 | Japan | 359/877 |

METHODS AND APPARATUS FOR AUTOMATING THE ADJUSTMENT OF REARVIEW MIRRORS

This application is a continuation-in-part of application Ser. No. 08/370,753 filed on Jan. 10, 1995, now abandoned, which is a continuation-in-part of application Ser. No. 08/348,092 filed on Nov. 25, 1994 and now abandoned.

FIELD OF THE INVENTION

This invention relates to the methods and apparatus for adjusting rearview mirrors of vehicles.

BACKGROUND OF THE INVENTION

Most motor vehicles (cars and trucks) have rearview mirrors. In some countries, only one central inside mirror is required by law, but in many countries, it is mandatory to have three rearview mirrors: a central inside mirror, and one outside rearview mirror on each side of the vehicle.

For driving comfort and safety reasons, it is essential to ensure that rearview mirrors are oriented correctly, to give the driver a clear view of the road behind him. Mirror orientation depends upon the position of the driver's head during driving. Drivers with longer upper bodies tend to hold their heads at a higher level relative to the rearview mirror. Likewise, drivers with longer legs tend to position the driver's seat farther back to attain a comfortable driving position. Rearview mirrors are therefore typically mounted to a vehicle in adjustable mountings, to enable drivers of various body proportions to orient them correctly.

When the same motor vehicle is driven by a number of drivers having different body proportions, for example family members, rental car users, fleet drivers, etc., it becomes necessary for each driver to readjust the orientation of the rearview mirrors, if the vehicle has been previously driven by a driver with different body proportions.

In the case of a motor vehicle having only one central rearview mirror, it is relatively easy for the driver to adjust the rearview mirror orientation. When the motor vehicle also has a driver's side mirror, the adjustment becomes more complicated and time consuming, especially if it is necessary to roll down the window to set the mirror. In the case of most modern vehicles, it is possible to set the driver's side rearview mirror from inside the vehicle by manually operating a lever or switch, but this is one operation which drivers would prefer not to perform.

In the case of vehicles having a third rearview mirror located on the passenger side of the vehicle, it becomes necessary for the driver to move to the passenger seat, open the window, and adjust the mirror, in the case of vehicles not equipped with an inside adjustment mechanism. Even in the case of vehicles which have an adjustment device on the inside of the passenger door, it is necessary for the driver to lean over the passenger seat to operate the device. In both cases, the mirror setting becomes a trial and error procedure, which takes time, since the driver must judge the results of his adjustment efforts by sitting upright in the driver's seat. It is unlikely that the driver will obtain the correct mirror orientation in his first attempt.

In the case of vehicles having electric or electronic controls located on the driver's side of the vehicle for adjusting both outside mirrors, the process of frequently adjusting three rearview mirrors remains a nuisance.

Mirror systems able to memorize mirror positions, typically allow a limited number of users (2-3) to store the corresponding settings, and require the adjustment of all mirrors before storing their positions. Furthermore, such settings may often require further adjustments, since the posture of any one driver may change from time to time, again making the process of adjusting rearview mirrors a nuisance.

There is accordingly a need for methods and apparatus for further automating the adjustment of rearview mirrors. These methods and apparatus are particularly useful in the case of vehicles being shared by drivers with different body proportions, different driving postures and habits.

SUMMARY OF THE INVENTION

The present invention is directed towards apparatus for automating the orientation of a selected mirror. The apparatus comprises location means for sensing current values of location variables related to the location of the driver's eyes, control means responsive to the location means for determining a desired orientation for the mirror based upon known vehicle and known vision parameters, and mirror positioning means responsive to the control means for positioning the remote mirror to achieve the orientation.

The location means may take the form of headrest position sensing means for determining the location of the headrest of the driver's seat, or image sensing means for sensing an image of the individual's head.

The subject apparatus may be used on vehicles having at least one remote mirror and a proximate mirror directly adjustable by a driver while seated in a driving position in a driver's seat. In this case, the location means may take the form of a distance sensor for sensing the distance between the proximate mirror and the driver's eyes, and an orientation detector for detecting the orientation of the proximate mirror after it has been adjusted by the driver.

In the case of a vehicle having a first proximate mirror and second proximate mirror directly adjustable by the driver, the location means may take the form of a first orientation detector for detecting the orientation of the first proximate mirror, and a second orientation detector for detecting the orientation of the second proximate mirror. If however, it is assumed that the driver seats himself in the driver's seat directly behind the steering wheel in a known lateral position, the location means may take the form of an orientation detector for detecting the orientation of a single proximate mirror after it has been adjusted by the driver.

The control means is preferably a microcomputer having processing means which include:

(a) location determining means responsive to location signals generated by the location means and the vehicle parameters and vision parameters for determining the coordinates of the eyes of the individual;

(b) mirror orientation determining means responsive to the location determining means for determining a desired orientation for the mirror based upon the vehicle parameters, vision parameters and the coordinates of the eyes of the individual; and (c) mirror servo-control means responsive to the mirror orientation determining means for determining the necessary adjustments to the orientation of the remote mirror to achieve the desired orientation of the remote mirror.

The subject invention is also directed towards a method for automatically adjusting the orientation of a selected mirror having a center point of known coordinates and rotatable about a selected rotation point, to enable an individual using the mirror to achieve a pre-selected reflected sightline in the mirror defined by a reflected sightline vector intersecting the mirror at the center point, the method comprising the steps of:

(a) determining the coordinates of the eyes of the individual;

(b) determining the desired orientation of the mirror based upon the coordinates of the eyes of the individual and the center point of the mirror and the reflected sightline vector; and (c) positioning the mirror to match the desired orientation.

The present invention is also directed to a method implemented in data processing apparatus for determining the desired orientation of a selected mirror having a center point of known coordinates and rotatable about a selected rotation point, to enable an individual using the mirror to achieve a pre-selected reflected sightline in the mirror, defined by a reflected sightline vector intersecting the mirror at the center point, the method comprising the steps of:

(a) determining a direct sightline vector extending from the coordinates of the individual's eyes to the center point of the mirror;

(b) determining a sightline plane formed by the direct sightline vector and the reflected sightline vector intersecting at the mirror center point; and (c) determining the desired mirror orientation by determining a bisecting vector bisecting the angle formed by the direct sightline vector and the reflected sightline vector intersecting at the center point of the mirror on the sightline plane.

BRIEF DESCRIPTION OF THE DRAWINGS

The invention will now be described, with reference to the following drawings, in which.

DETAILED DESCRIPTION OF THE PREFERRED EMBODIMENTS

Figure 1:
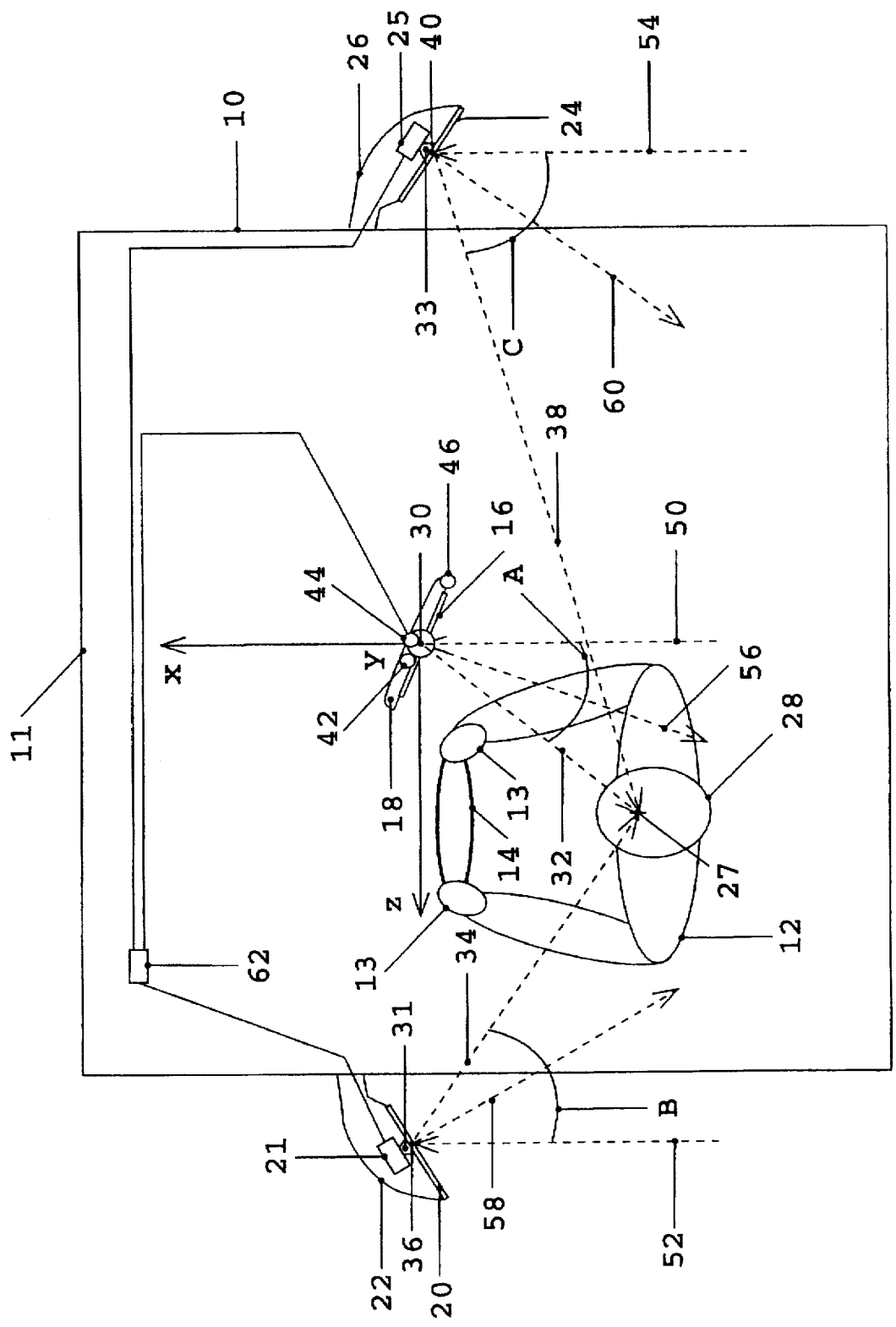
FIG. 1 is a schematic top plan view of a vehicle equipped with mirror adjustment apparatus made in accordance with a preferred embodiment of the subject invention.

FIG. 1 illustrates vehicle 10 incorporating a preferred embodiment of the subject invention. Driver 12 with hands 13 is shown positioned in a driving position behind steering wheel 14. Central inside mirror 16 is mounted on vehicle 10 in a central mirror mount 18. Left outside rearview mirror 20 is mounted in left mirror housing 22 located below the lower front end of the driver's side window. Right outside rearview mirror 24 is mounted in right outside mirror housing 26 located outside the lower front end of the passenger's side window.

The location of driver's eyes 27 is modelled as the location of one cyclopic eye positioned at the point about which the driver's head 28 pivots when the driver 12 observes an image in one of the three mirrors 16, 20 and 24.

In the coordinate system shown in FIG. 1, the origin of the coordinate system is at the center point 30 of central mirror 16, the X axis points forward along the longitudinal axis of vehicle 10, the Y axis is vertical, pointing up, and the Z axis points transversely to the left. Vector 32 is the vector between the center point 30 of central mirror 16 and the driver's eyes 27. Vector 34 is the vector between the center point 36 of left mirror 20 and the driver's eyes 27. Vector 38 is the vector between the center point 40 of right mirror 24 and the driver's eyes 27.

In the preferred embodiment, the subject apparatus comprises location means, control means, and mirror positioning means. The location sensing means comprises a distance sensor 42, an orientation detector 44, and a switch 46. The control means comprises a microcomputer 62. The mirror positioning means comprise servomechanisms 21 and 25.

Distance sensor 42, typically an infrared or ultrasound sensor, is located on the mirror mount 18 of central mirror 16. Distance sensor 42 determines the distance between the central mirror 16 and the driver's eyes 27. Central mirror orientation detector 44 is located on mirror mount 18, and detects the orientation of central mirror 16 after it has been manually adjusted by driver 12. Orientation detector 44 may comprise a two degree of freedom electro-mechanical rotational-position sensing device able to detect the rotation of the central mirror 16 in the Y axis and in a rotational axis orthogonal to the Y axis. Switch 46 located on mirror mount 18 activates distance sensor 42, and orientation detector 44. Alternatively, switch 46 could activate microcomputer 62 to receive signals from distance sensor 42 and orientation detector 44.

Servomechanisms 21, 25 for positioning mirrors 20 and 24 are located within the respective mirror housings 22, 26. Each of servomechanism 21, 25 may comprise a pair of servomotors coupled together and rotatable about orthogonal axes, mechanically coupled to mirrors 20, 26 by linkages 31, 33. Each servomotor may comprise an electric motor and a position sensor such as a potentiometer coupled to the shaft of the motor. The rotation of servomotors results in the rotation of mirrors 20, 24.

Central mirror 16 is regarded to be set correctly when light ray 50 is reflected in the direction of the driver's eyes 27 after hitting the center point 30 of mirror 16. This correct setting is defined by unit vector 56, which is the directional vector normal to the plane of mirror 16. Likewise, mirrors 20, 24 are considered to be set correctly as defined by unit vectors 58 and 60 respectively, which are the directional vectors normal to the planes of the mirrors 20, 24, when light rays 52, 54 are reflected in the direction of the driver's eyes 27 after hitting the center points 36, 40 of mirrors 20, 24. Light rays 50, 52 and 54 represent desired reflected sightlines. In general, they are horizontal rays of light parallel to the longitudinal axis of vehicle 10, typically in the form of unit vectors. However, these light rays could be rays from other directions necessary to achieve a desired field of view for rearview vision purposes. Typically the direction of light rays 50, 52 and 54 would be determined by the vehicle's manufacturer for each particular vehicle.

Figure 2:
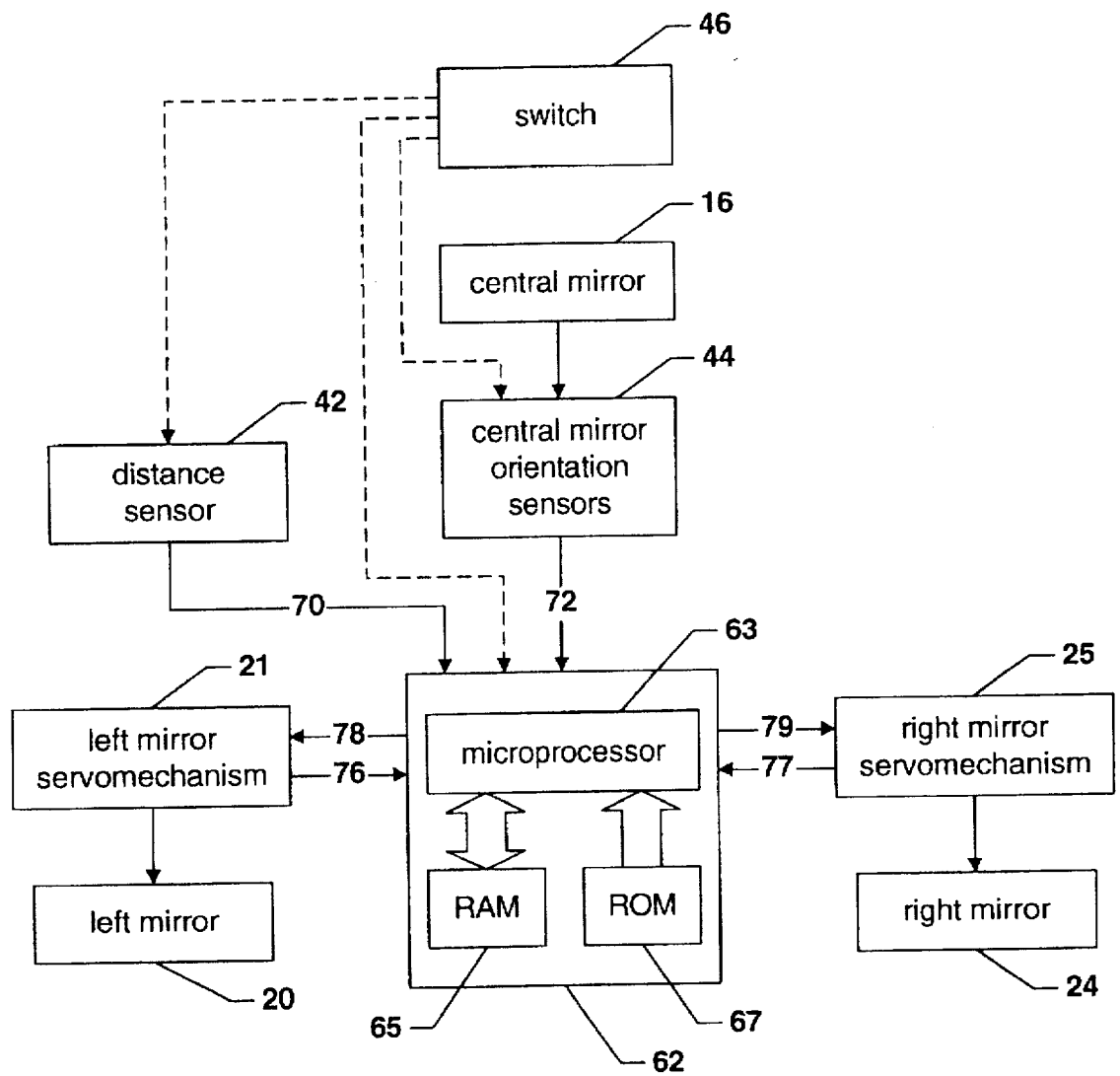
FIG. 2 is a diagram of the components of the preferred embodiment.

Referring now to FIG. 2, the subject apparatus comprises control means in the form of microcomputer 62 located at a convenient location in vehicle 10, electrically coupled to the other components of the subject apparatus by cables or other electrical connections. Microcomputer 62 includes a microprocessor 63 having RAM memory 65 and ROM memory 67, in which are stored vehicle parameters such as the coordinates of the center points 30, 36 and 40, of all mirrors 16, 20 and 24, as determined from vehicle dimensions and mirror locations. Similarly, known vision parameters such as light rays 52, 50 and 54 are stored in the ROM memory 67. Once activated by switch 46, microcomputer 62 receives distance signal 70 from distance sensor 42, and orientation signal 72 from central mirror orientation detector 44. Microprocessor 63 processes these signals in a manner hereinafter described, and generates output control signals 78, 79 to mirror servomechanisms 21, 25, respectively based on feedback signals 76, 77.

Figure 3:
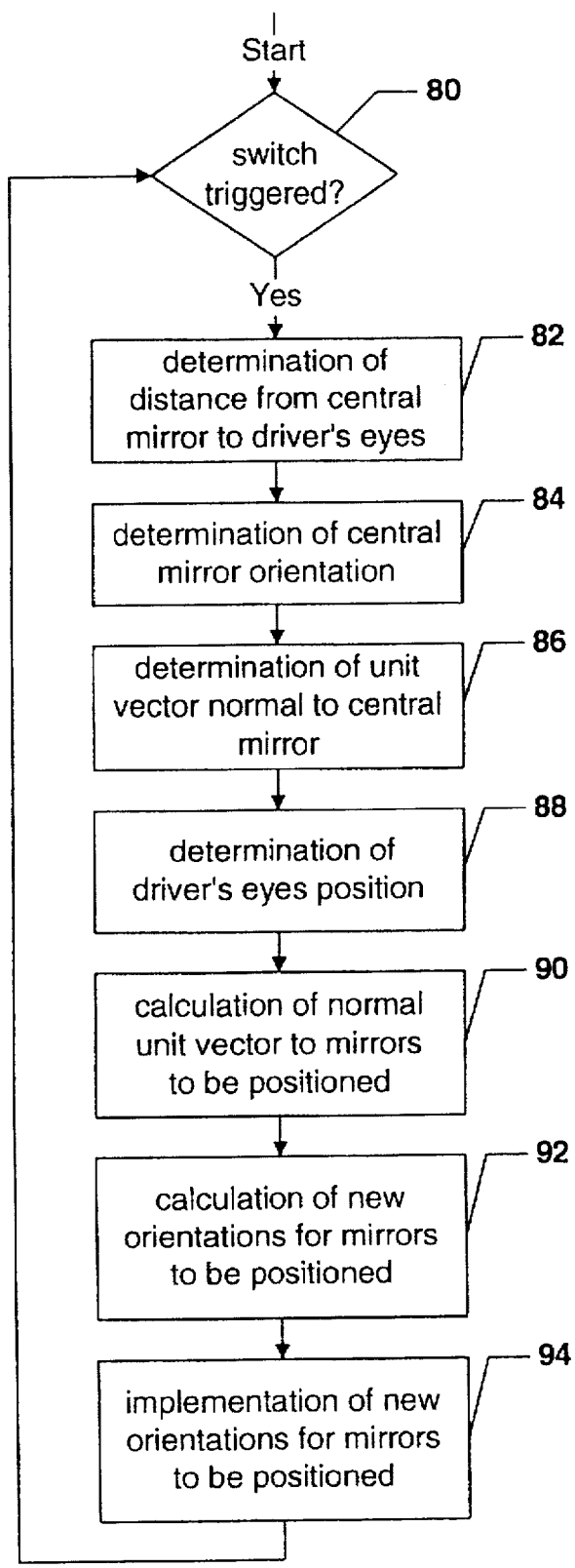
FIG. 3 is a flow chart of a program for the control means shown in FIG. 2.

Referring now to FIG. 3, control means in the form of microcomputer 62 is programmed with computer software stored in ROM memory 67, which operates as follows. When switch 46 is triggered (block 80), control means in the form of microcomputer 62 is activated and receives signals 70 and 72 from the location means in the form of distance sensor 42 and orientation detector 44. Control means then determines the distance between central mirror 16 and driver's eyes 27 (block 82), the orientation of the central mirror (block 84), the unit vector 56 normal to the central mirror (block 86) and vector 32 defining the position of the driver's eyes 27 (block 88). Subsequently, control means determines unit vectors 58 and 60 normal to the left mirror 20 and right mirror 24 in their desired orientation (block 90) which respectively define the desired orientation of these mirrors, and thus determines the new servomechanism positions for the left mirror 20 and right mirror 24 (block 92), and generates position control signals 78 and 79 which implement the new servomotor positions (block 94).

Microcomputer 62 determines the required orientation of the outside mirrors by implementing the following algorithm. Given:

(1) the coordinates of center points 36 (left hand mirror) 30 (central mirror) and 40 (right hand mirror), (2) the distance from the point 30 (central mirror) to the driver's eyes 27 provided by distance sensor 42, (3) the orientation of the central mirror provided by central mirror orientation detector 44, and (4) the unit direction vectors for light rays 52, 50 and 54, the unit vector 58 normal to the surface of mirror 20 in its desired orientation, and the unit vector 60 normal to the surface of mirror 24 in its desired orientation are determined as follows:

(a) From the orientation of the central mirror 16 provided by central mirror orientation detector 44, the unit vector 56 normal to the surface of central mirror 16 is directly calculated by translating the mirror orientation detector 44 positions expressed in its coordinate system (for example a rotational coordinate system) to the X-Y-Z coordinate system.

(b) Given the unit vector 56 and the unit vector 50, the direction of vector 32 is determined from physics (light reflecting on a mirror): it is known that the unit vector 56 bisects the angle A formed by the vectors 32 and 50 intersecting at point 30 on the plane they form.

(c) Having determined the direction of vector 32, and knowing the distance from the central mirror center point 30 to the driver's eyes 27, vector 32 is fully defined, yielding the coordinates of the driver's eyes 27.

(d) Given the coordinates of the left mirror center point 36 and the coordinates of the driver's eyes 27, vector 34 joining the two points is directly determined.

(e) Similarly, given the coordinates of the right mirror center point 40 and the coordinates of the driver's eyes 27, vector 38 joining the two points is directly determined.

(f) Given the unit vector 34 and the unit vector 52, the unit vector 58 normal to the surface of the left hand mirror 20 is determined from physics (light reflecting on a mirror): it is known that the unit vector 58 bisects the angle B formed by the vectors 34 and 52 intersecting at point 36 on the plane they form.

(g) Similarly, given the unit vector 38 and the unit vector 54, the unit vector 60 normal to the surface of the right hand mirror 24 is determined from physics (light reflecting on a mirror): it is known that the unit vector 60 bisects the angle C formed by the unit vectors 38 and 54 intersecting at point 40 on the plane they form.

The above steps may be similarly repeated for any other mirror considered to determine the corresponding unit vector normal to the mirror's surface.

In use, the driver 12 manually adjusts central mirror 16, activating switch 46 which in turn activates the control means. Control means receives signals 70 and 72 from location means in the form of distance sensor 42 and central mirror orientation detector 44. Distance sensor 42 measures the distance between the central mirror 16 and the driver's eyes 27, and central mirror orientation detector 44 measures the orientation of central mirror 16. The signals from distance sensor 42 and central mirror orientation detector 44 are processed by the control means to determine normal unit vector 56 and vector 32 defining the coordinates of the driver's eyes 27. Mirror orientation determination means subsequently determines normal unit vectors 58, 60 which define the orientation of outside mirrors 20, 24. Mirror servo-control means subsequently generates position control signals 78, 79 based on feedback signals 76, 77, to activate servomechanisms 21, 25 respectively, which reposition outside mirrors 20, 24 so that their surfaces become normal to vectors 58 and 60 respectively.

Figure 4:
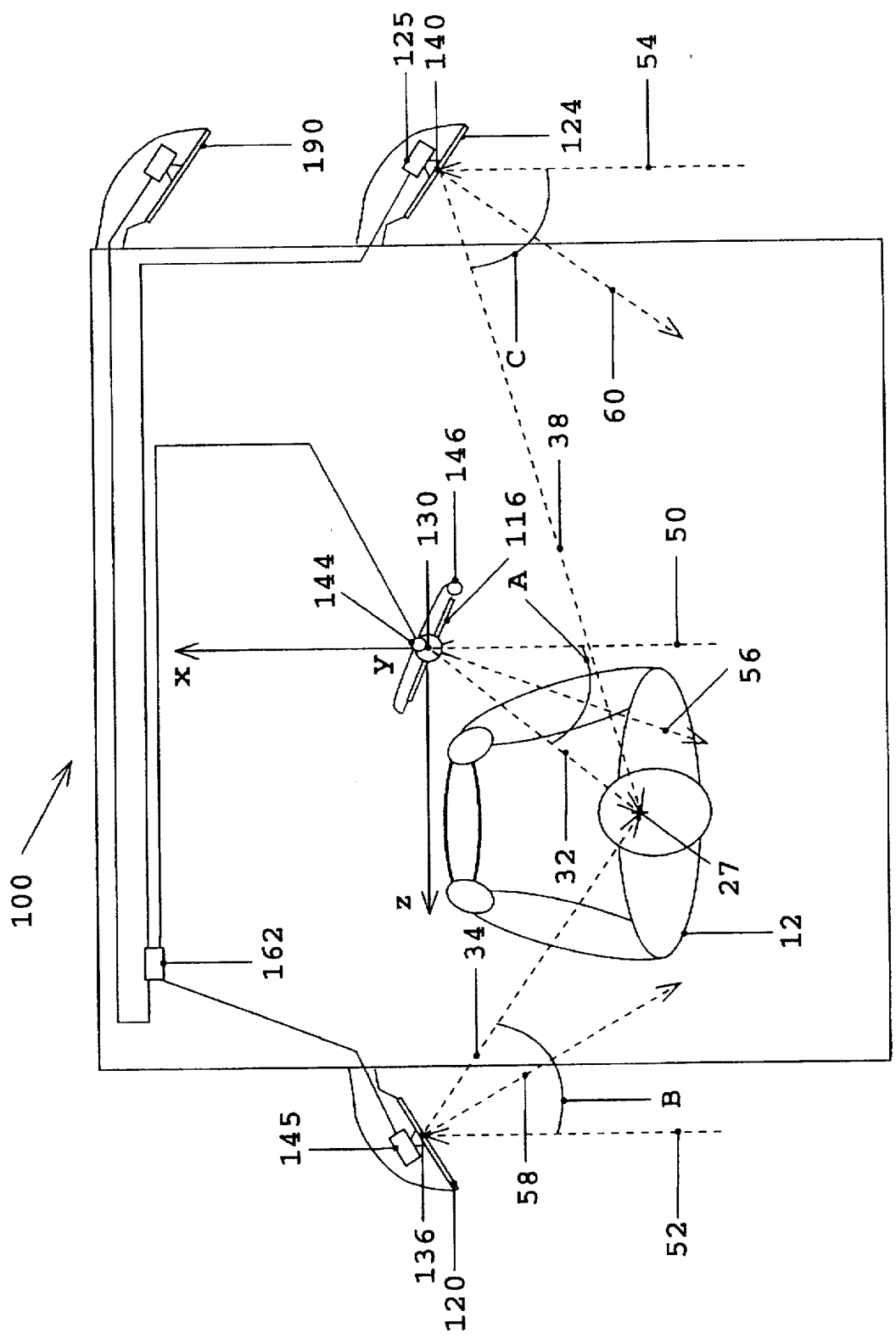
FIG. 4 is a schematic top plan view of an alternative embodiment of the invention.

Referring now to FIG. 4, in a first alternative embodiment, the subject apparatus shown generally as 100 is adapted to allow the driver to adjust manually both a first proximate mirror (typically the inside central mirror), and a second proximate mirror (typically the driver's side mirror). Once these adjustments are performed, apparatus 100 then automatically adjusts one or more remote mirrors, such as the passenger side mirror 124.

Apparatus 100 comprises location means, control means and position means. Location means comprises a central mirror orientation detector 144 and driver's side mirror orientation detector 145. The control means comprises a microcomputer 162. The mirror positioning means comprises servomechanism 125. The vehicle parameters comprise the location of center points 130, 136 and 140 of mirrors 116, 120 and 124 respectively. The vision parameters comprise the light rays 50, 52 and 54. Orientation detectors 144, 145 detect the orientation of the mirrors 116, 120 once they are manually adjusted and switch 146 is activated. Microcomputer 162 is programmed to perform a triangulation algorithm, which provides the control signals for properly orienting passenger's side mirror 124, as well as any additional rearview mirror 190 that may be mounted on a large vehicle such as a truck.

In use, the driver adjusts both the central mirror 116 and the driver's side mirror 120, activating switch 146, which results in apparatus 100 automatically adjusting remote mirrors 124 and 190. An advantage of this alternative embodiment of the invention is that apparatus 100 does not require a distance sensor for sensing the distance between the central mirror and the driver's eyes 27, or a servomechanism for the driver's side mirror, although an orientation detector is nevertheless required to determine the orientation of the driver's side mirror.

Microcomputer 162 determines the orientation of passenger side mirror 124 by implementing the following algorithm. Given:

(1) the coordinates of center points 140 (remote mirror) 130 (first proximate mirror) and 136 (second proximate mirror), (2) the orientation of the first proximate mirror provided by central mirror orientation detector 144, (3) the orientation of the second proximate mirror provided by second mirror orientation detector 145, and (4) the unit direction vectors for light rays 52, 50 and 54, the unit vector 60 normal to the surface of passenger side mirror 124 (or other remote mirror) is determined as follows:

(a) From the orientation of the first proximate mirror 116 provided by orientation detector 144, the unit vector 56 normal to the surface of mirror 116 is directly calculated by translating the orientation detector 144 positions expressed in its coordinate system (for example a rotational coordinate system) to the X-Y-Z coordinate system.

(b) From the orientation of the second proximate mirror 120 provided by second mirror orientation detector 145, the unit vector 58 normal to the surface of mirror 120 is directly calculated by translating the mirror orientation detector 145 positions expressed in its coordinate system (for example a rotational coordinate system) to the X-Y-Z coordinate system.

(c) Given the unit vector 56 and the unit vector 50, the direction of vector 32 is determined from physics (light reflecting on a mirror): it is known that the unit vector 56 bisects the angle A formed by the vectors 32 and 50 intersecting at point 130 on the plane they form.

(d) Given the unit vector 58 and the unit vector 52, the direction of vector 34 is determined from physics (light reflecting on a mirror): it is known that the unit vector 58 bisects the angle B formed by the unit vectors 34 and 52 intersecting at point 136 on the plane they form.

(e) Having calculated the direction of vectors 32 and 34, the coordinates of the driver's eyes 27 are determined by finding the intersection of the line with origin center point 136 and direction vector 34 and the line with origin center point 130 and direction vector 32. If the first proximate mirror 116 and second proximate mirror 120 are set with slight inaccuracies and the line with origin center point 136 and direction vector 34 and the line with origin center point 130 and direction vector 32 do not actually intersect, the driver's eye position is approximated by the midpoint of the shortest line segment linking the two lines (standard geometric calculation).

(f) Given the coordinates of the other mirror center point 140 and the coordinates of the driver's eyes 27, vector 38 joining the two points is directly determined.

(g) Given the vector 38 and the unit vector 54, the unit vector 60 normal to the surface of the right hand mirror 124 is determined from physics (light reflecting on a mirror): it is know that the unit vector 60 bisects the angle C formed by the unit vectors 38 and 54 intersecting at point 140 on the plane they form.

Figure 5:
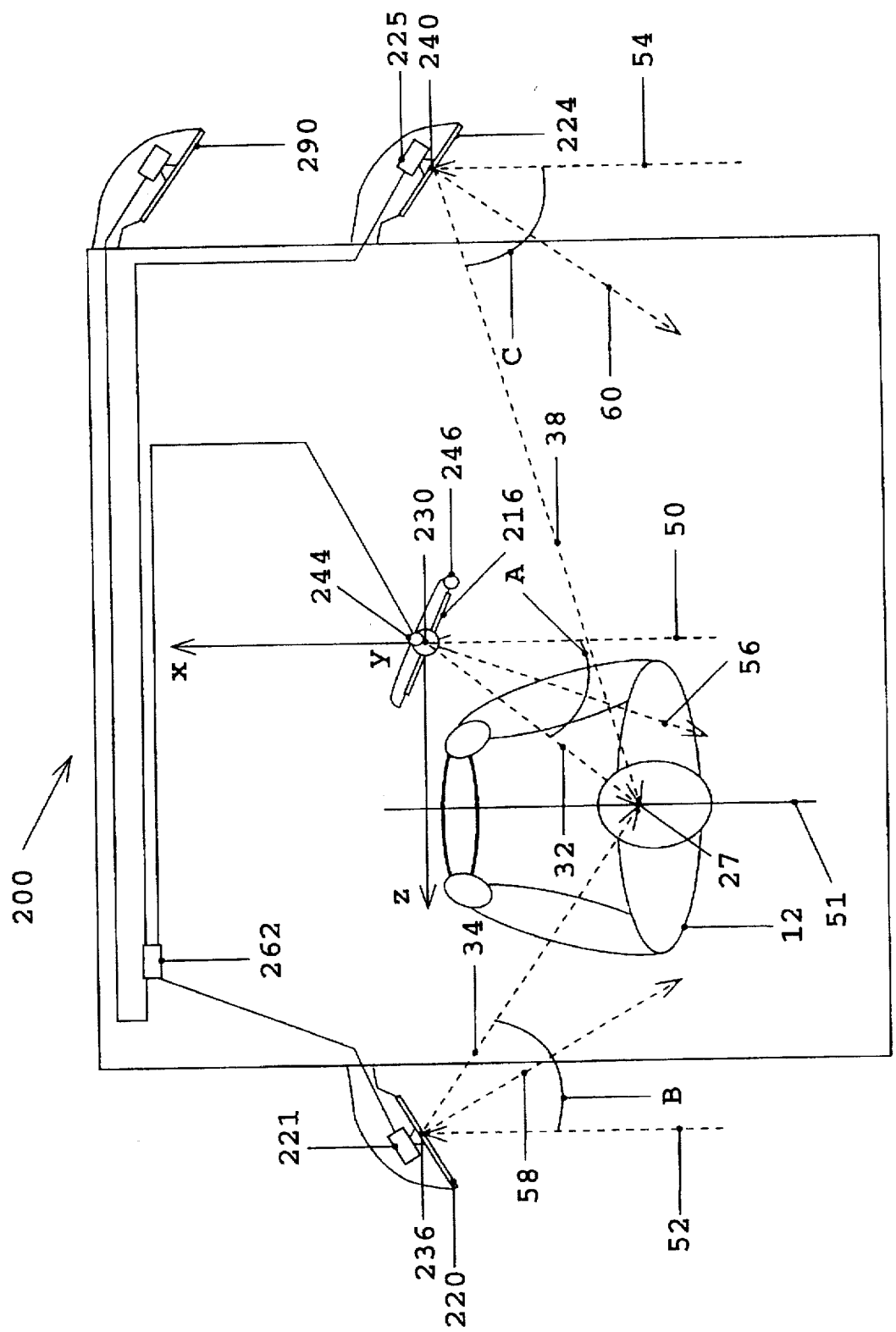
FIG. 5 is a schematic top plan view of a second alternative embodiment of the subject invention.

Referring now to FIG. 5, in a second alternative embodiment, the subject apparatus shown generally as 200 comprises location means in the form of a central mirror orientation detector 244, control means in the form of a microcomputer 262, and mirror positioning means in the form of servomechanisms 221, 225.

In this second alternative embodiment, it is assumed that the driver will situate himself in a known lateral position (typically symmetrically behind the steering wheel). The Z coordinate of the driver's seating position is therefore assumed to be the intersection of plane 51 with the Z axis. The plane 51 is vertical and parallel to the XY plane and passes through the center of the driver's seat, symmetrically dividing the driver 12 in two, and containing the driver's eye 27. The vehicle parameters comprise the location of center points 230, 236 and 240 of mirrors 216, 220 and 224 respectively, and the Z coordinate of the driver's seating position. The rearview vision parameters comprise the light rays 50, 52 and 54. The driver is simply required to adjust manually one proximate mirror (typically the inside central mirror). Once this adjustment is performed, the position of the driver's eyes 27 is determined.

Orientation detector 244 detects the orientation of the mirror 216 once it is manually adjusted and switch 246 is activated. Microcomputer 262 is programmed to perform a triangulation algorithm, which provides the control signals for properly orienting mirrors 220 and 224, as well as any additional rearview mirror 290.

In use, the driver adjusts the central mirror 216 and activates switch 246, which results in apparatus 200 automatically adjusting remote mirrors 220, 224 and 290. An advantage of this alternative embodiment of the invention is that apparatus 200 does not require a distance sensor for sensing the distance between the central mirror and the driver's eyes 27. Further, only one proximate mirror needs to be manually adjusted. Nevertheless, the Z coordinate of the driver's seating position as defined above must be known, and input as a vehicle parameter into the memory of microcomputer 262.

Microcomputer 262 determines the required orientation of the remote mirrors by implementing the following algorithm. Given:

(1) the coordinates of center points 236 (left hand mirror) 230 (central mirror) and 240 (right hand mirror), (2) the Z coordinate of the driver's seating position and eyes given by the intersection of the vertical plane 51 with the Z axis, (3) the orientation of the central mirror provided by central mirror orientation detector 244, and (4) the unit direction vectors for light rays 52, 50 and 54, the unit vector 58 normal to the surface of mirror 220, and the unit vector 60 normal to the surface of mirror 224 are determined as follows:

(a) From the orientation of the central mirror 216 provided by central mirror orientation detector 244, the unit vector 56 normal to the surface of central mirror 216 is directly calculated by translating the mirror orientation detector 244 positions expressed in its coordinate system (for example a rotational coordinate system) to the X-Y-Z coordinate system.

(b) Given the unit vector 56 and the unit vector 50, the direction of vector 32 is determined from physics (light reflecting on a mirror): it is known that the unit vector 56 bisects the angle A formed by the vectors 32 and 50 intersecting at point 230 on the plane they form.

(c) Given the direction of vector 32, the coordinates of the driver's eyes 27 can be determined since the driver's eyes 27 constitute the intersection of the line of direction vector 32 passing through center point 230 with the vertical plane 51.

(d) Given the coordinates of the left mirror center point 236 and the coordinates of the driver's eyes 27, vector 34 joining the two points is directly determined.

(e) Similarly, given the coordinates of the right mirror center point 240 and the coordinates of the driver's eyes 27, vector 38 joining the two points is directly determined.

(f) Given the unit vector 34 and the unit vector 52, the unit vector 58 normal to the surface of the left hand mirror 220 is determined from physics (light reflecting on a mirror): it is known that the unit vector 58 bisects the angle B formed by the vectors 34 and 52 intersecting at point 236 on the plane they form.

(g) Similarly, given the unit vector 38 and the unit vector 54, the unit vector 60 normal to the surface of the right hand mirror 224 is determined from physics (light reflecting on a mirror): it is known that the unit vector 60 bisects the angle C formed by the unit vectors 38 and 54 intersecting at point 240 on the plane they form.

The above steps may be similarly repeated for any other mirror considered to determine the corresponding unit vector normal to the mirror's surface.

Figure 6:
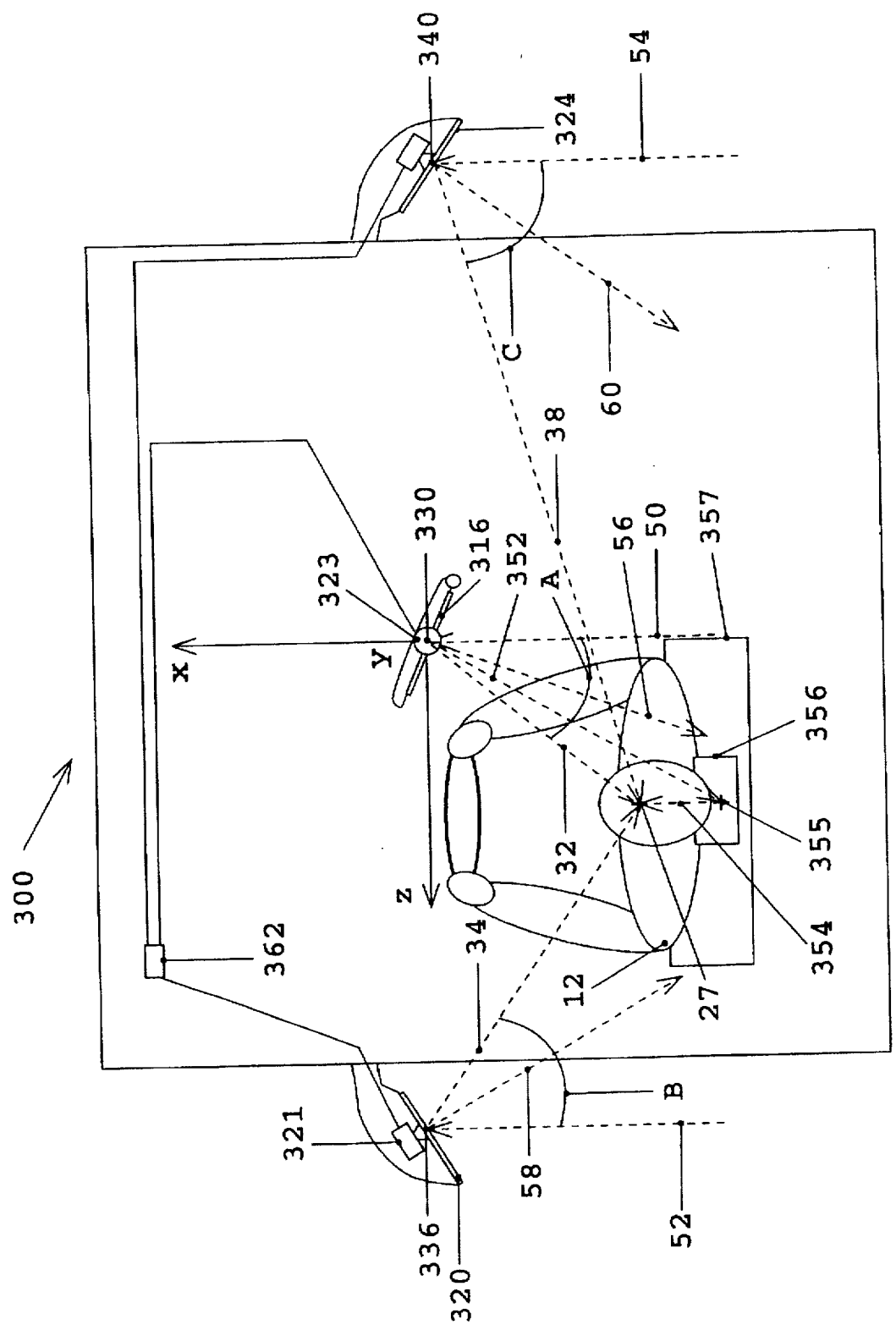
FIG. 6 is a schematic top plan view of a third alternative embodiment of the subject invention.

Referring now to FIG. 6, in a third alternative embodiment of the subject apparatus, referred to generally as apparatus 300, it is assumed that the driver's eyes 27 will be situated in a known position defined by vector 354, relative to the position 355 of the headrest 356. The driver is simply required to activate switch 346 causing the position of his eyes to be determined.

Apparatus 300 includes location means, control means and position detecting means. The location means takes the form of position detecting means for detecting the position 355 of the headrest 356 of the driver seat 357. Head position detecting means 355 could, for example, comprise the position sensors used in power-adjusted seating mechanisms able to memorize the position of their components (seat, backrest, headrest, etc.) in relation to one another. The control means comprises a microcomputer 362 like microcomputer 62 of the preferred embodiment. The mirror positioning means comprise servomechanisms 321, 323 and 325, for mirrors 320, 316 and 324 respectively. The vehicle parameters include not only the location of the center points 330, 336 and 340 of the mirrors 316, 320 and 324 respectively, but also the assumed driver's eyes position vector 354 relative to the headrest position 355. The rearview vision parameters comprise the light rays 50, 52 and 54. Microcomputer 362 is programmed to perform a triangulation algorithm which determines the driver's eyes position 27, by implementing the following location determination algorithm. Given:

(1) the coordinates of the position 355 of the headrest 356, in the form of vector 352, and (2) the driver's eyes position relative to the position 355 of the headrest 356, defined by vector 354, the vector 32 defining the position of the driver's eyes 27 is determined by vector addition of vectors 352 and 354. Microcomputer 362 then determines the desired orientation of all three mirrors by implementing a mirror orientation determination algorithm similar to those of the previous embodiments.

Figure 7:
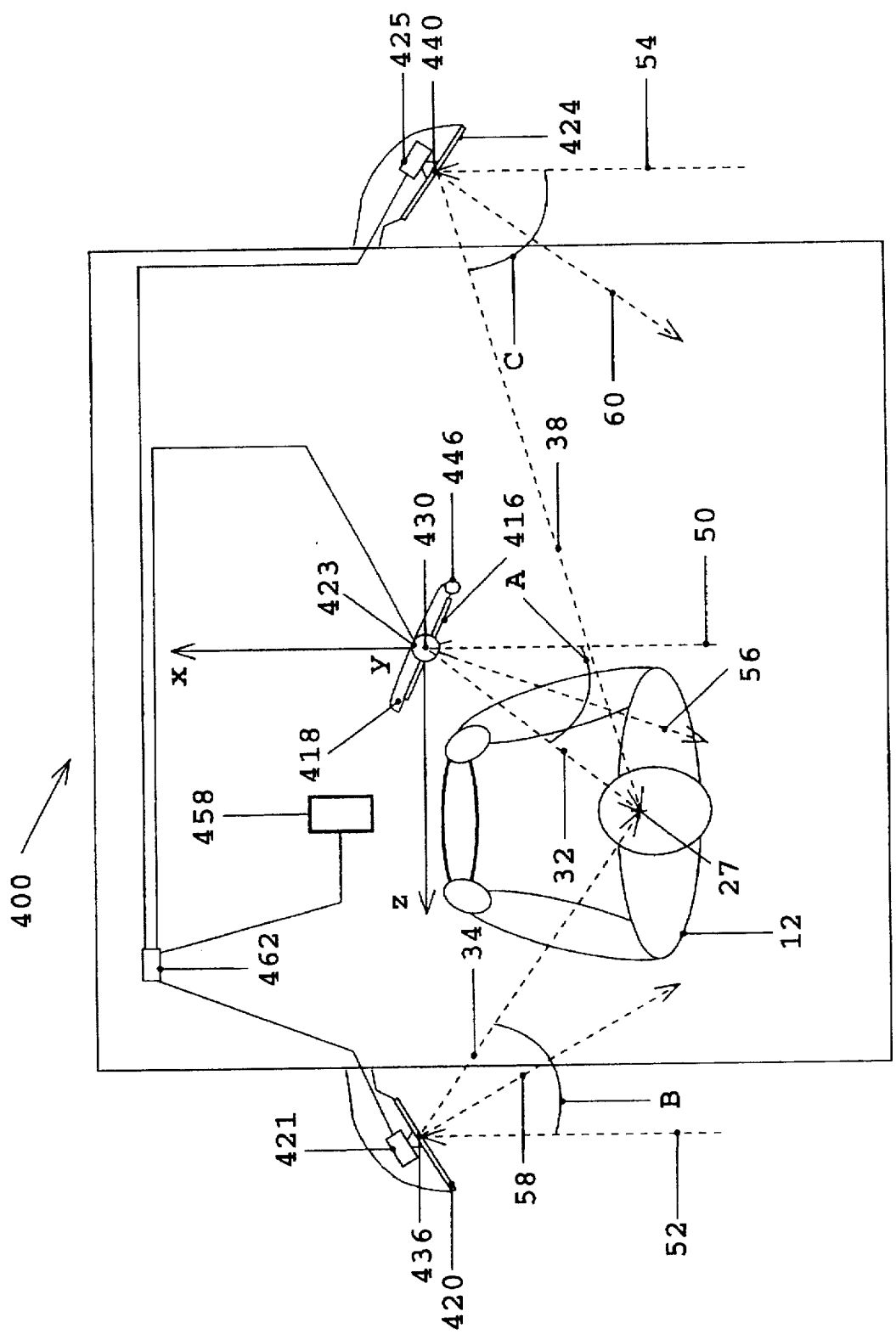
FIG. 7 is a schematic top plan view of a fourth alternative embodiment of the subject invention.

Referring now to FIG. 7, in a fourth alternative embodiment, the apparatus of the subject invention, shown generally as 400, comprises location means in the form of image sensing means 458, control means in the form of a microcomputer 462, and mirror positioning means in the form of servomechanisms 421, 423 and 425 for mirrors 420, 416 and 424 respectively. The vehicle parameters comprise the location of center points 430, 436 and 440 of mirrors 416, 420 and 424. The rearview vision parameters comprise the light rays 50, 52 and 54.

The driver is simply required to activate switch 446 which triggers image sensing means 458 which records an image of the driver's head, and generates an output signal correlatable therewith. This output signal is then sent to microcomputer 462, which processes the signal and determines the location of the driver's eyes. Once this location is known, microcomputer 462 can determine the desired orientation of mirrors 416, 420 and 424 by implementing a mirror orientation algorithm similar to those described hereinabove. Image sensing means 458 may comprise a vision system such as a videocamera, or other imaging or beam projection and detection apparatus utilizing sound, ultrasound, infrared or other radiation field, to create and record an image of the driver's head.

An advantage of the third and fourth alternative embodiments 300, 400 is that they do not require the driver to manually adjust any of the mirrors for location purposes. Nevertheless, servomechanisms are required for all mirrors requiring adjustment in order for the control and positioning means to detect the mirrors' current positions and reorient them accordingly.

Figure 8:
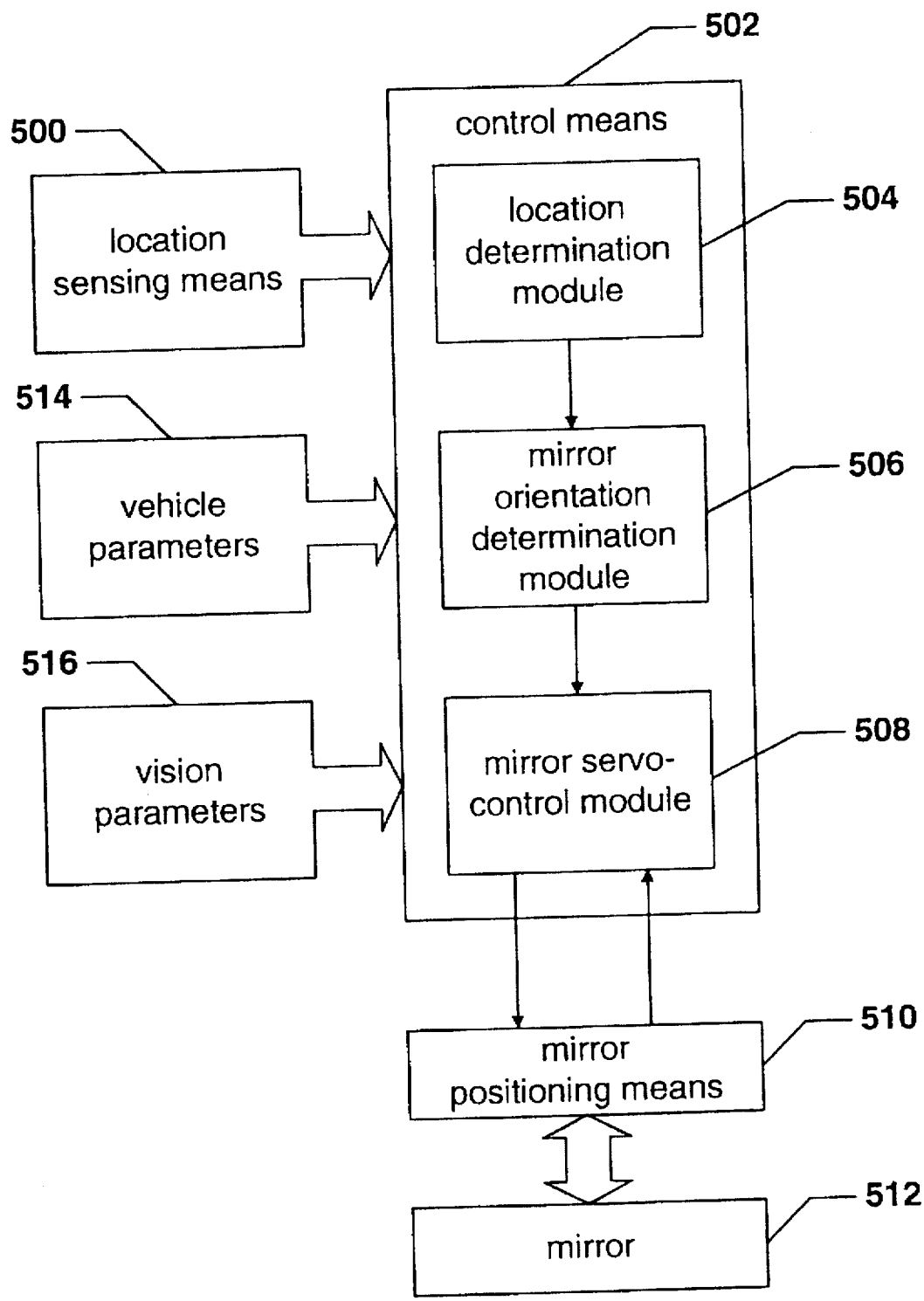
FIG. 8 is a schematic diagram of apparatus which may be used to implement the methods of the subject invention.

Referring now to FIG. 8, it should be apparent from the above descriptions of the preferred and various alternative embodiments that the location means 500 of the subject invention can take various forms as follows:

1) in the case of preferred embodiment, location means 500 comprise orientation detecting means for detecting the orientation of the proximate mirror after it has been adjusted by the driver, and sensing means for determining the distance between the proximate mirror and the driver's eyes, preferably an infrared or ultrasound sensor mounted on the central mirror mount or other suitable location;

2) in the case of the first alternative embodiment 100, location means 500 comprises orientation detecting means for detecting the orientation of the proximate mirror (after it has been adjusted by the driver), and a second orientation detecting means for detecting the orientation of a second proximate mirror (after it too has been adjusted by the driver);

3) in the case of the second alternative embodiment 200, location means 500 comprises orientation detecting means for detecting the orientation of the proximate mirror only (after it has been adjusted by the driver), as it is assumed that the driver will situate himself in a known lateral driving position in a driver's seat situated behind the steering wheel;

4) in the case of the third alternative embodiment 300, location means 500 comprises position detecting means for detecting the position of the driver's seat and headrest, once the driver has appropriately adjusted his driving seating position, which in turn provides the location of the driver's eyes by adding a vector representing an assumed position of the driver's eyes relative to the headrest; or 5) in the case of the fourth alternative embodiment 400, location means 500 comprises image sensing means for recording an image of the driver's head through video, ultrasound, infrared or other imaging means, after the driver has assumed a driving position.

In each of the above embodiments, the location means senses current values of location variables related to the location of the driver's eyes (eg. the orientation of a mirror after it has been adjusted by the driver to achieve a desired rearview sightline), and generates location signals correlatable therewith.

It should also be apparent that the control means 502 of the subject invention includes program modules for performing three different functions:

1) location determination module 504, which determines the position of the driver's eyes, based on the location signals provided by the location means 500, known vehicle parameters 514 and vision parameters 516;

2) mirror orientation determination module 506, which determines the desired orientation of the mirror to be adjusted for rearview vision purposes, based on the position of the driver's eyes, known vehicle parameters 514 and vision parameters 516; and 3) mirror servo-control module 508, which provides the mirror positioning means 510 with suitable positioning signals, based on the sensed mirror orientation and desired mirror orientation, in order to achieve the desired mirror orientation for mirror 512.

The present invention is also directed to methods for automatically adjusting the orientation of a selected mirror having a center point of known coordinates and rotatable about a selected rotation point, to enable an individual using the mirror to achieve a pre-selected reflected sightline in the mirror defined by a reflected sightline vector intersecting the mirror surface at the center point.

In a preferred embodiment, subject method comprising the steps of:

1. determining the coordinates of the eyes of an individual using the mirror;
2. determining the desired orientation of the mirror based upon the coordinates of the individual's eyes and the center point of the mirror, and the reflected sightline vector, by taking the following steps:
    (a) determining a direct sightline vector extending from the coordinates of the individual's eyes to the center point of the mirror;
    (b) determining a sightline plane formed by the direct sightline vector and the reflected sightline vector intersecting at the mirror center point;
    (c) determining the desired mirror orientation by determining a bisecting vector bisecting the angle formed by the direct sightline vector and the reflected sightline vector intersecting at the center point of the mirror on the sightline plane; and
    (d) determining the desired mirror orientation in the form of a unit vector obtained by normalizing the bisecting vector;

and 3. positioning the mirror to match the desired orientation to a desired degree of accuracy.

This method may be implemented by using one of the several embodiments of the location means 500 described hereinabove, the control means 502, and the positioning means 510. For example, in the case of the second alternative embodiment illustrated in FIG. 5, wherein the vehicle comprises a proximate mirror having a center point and a driver's seat having a center located at a known lateral distance from the longitudinal axis of the vehicle, step 1 of the subject method can be carried out by taking the following steps:

(a) determining a proximate mirror normal vector normal to the proximate mirror surface at the proximate mirror center point;

(b) determining a proximate mirror sight line plane formed by the reflected sight line vector and the proximate mirror normal vector intersecting at the proximate mirror center point;

(c) determining a proximate mirror direct sight line vector in the proximate mirror sight line plane, intersecting the reflected sight line vector at the proximate mirror center point, and forming with this vector an angle bisected by the proximate mirror normal vector;

(d) determining a proximate mirror direct sightline line defined by the direction of the proximate mirror direct sightline vector and the proximate mirror center point; and (e) determining the location of the driver's eyes as the intersection point of the proximate mirror direct sightline line with a vertical plane parallel to the longitudinal axis of the vehicle passing through the center of the driver's seat.

Further, it should be noted that in step 2 above, the desired orientation of the mirror may be determined either in the form of a vector normal to the mirror surface at its center point or in the form of corresponding rotational angles.

Figure 9:
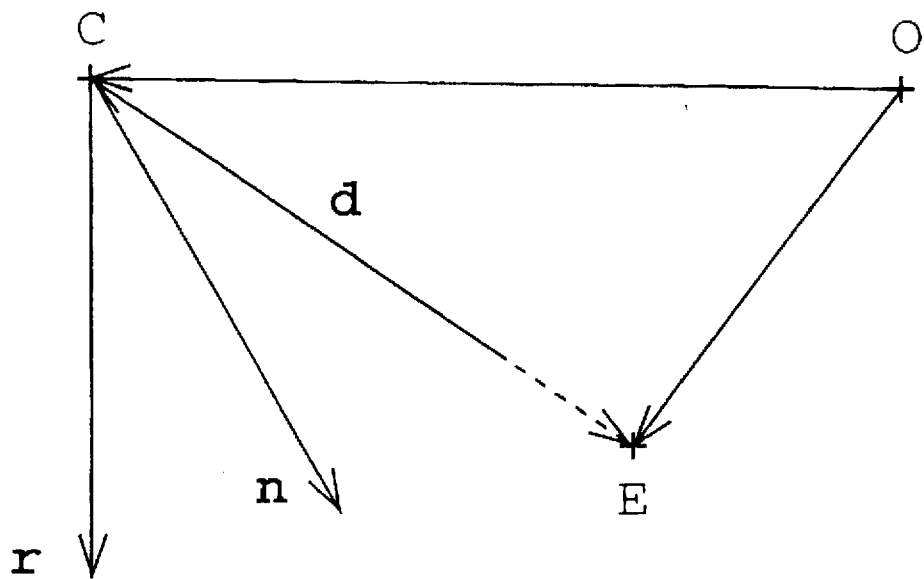
FIG. 9 is a vector diagram illustrating one embodiment of the subject method.

Referring now to FIG. 9, in a preferred embodiment, the mirror orientation determination module performs the following steps where:

O represents the origin of the coordinate system;

E represents the location of the driver's eyes;

C represents the location of a remote mirror center point;

n represents the unit vector normal to the remote mirror plane;

d represents the unit direct sightline vector; and r represents the unit reflected sightline vector.

Given 0, the origin of the coordinate system, E, the location of the driver's eyes, C, the location of a remote mirror center point, and r, the unit reflected sightline vector, the module performs the following steps:

1. Calculation of CE:

$$CE = OE - OC$$

2. Calculation of modulus of CE:

$$|CE|$$

3. Calculation of d:

$$d = -\frac{CE}{|CE|}$$

4. Calculation of r−d
5. Calculation of modulus of r−d:

$$|r-d|$$

6. Calculation of n:

$$n = \frac{r-d}{|r-d|}$$

7. Calculation of remote mirror orientation angles from n for the rotational coordinate system considered.

The above steps may be similarly repeated for any selected mirror to determine the corresponding unit vector normal to the mirror's surface, for example the central rearview mirror when such mirror is not used for location purposes.

While the methods and apparatus of the subject invention have been described and illustrated with respect to various preferred and alternative embodiments, it should be understood that:

(a) while in the preferred embodiment, the control means includes a location determining module which determines the location of the driver's eyes based on a location sensor which senses the distance between the central inside mirror and the driver's eyes, the location determining module could determine the location of the driver's eyes based on sensing means related to some other conveniently adjustable mirror located inside or outside the vehicle proximate the driver;

(b) the location determining module could determine the location of the driver's eyes based on other sensing means comprising a variety of sensors;

(c) while the proximate mirrors are described as being manually adjusted by the driver, these mirrors could be adjusted by the driver operating a suitable interface such as a keypad, a mechanical joystick or a switch apparatus activating the corresponding servomechanism;

(d) the rearview vision parameters could be directly adjusted by the driver through a suitable interface such as a keypad, mechanical joystick or a switch apparatus;

(e) the driver could override the positioning of any mirrors either manually, or through a suitable interface such as a keypad, mechanical joystick or switch apparatus activating the corresponding servomechanism;

(f) while the various embodiments utilize a single form of location means, the subject apparatus could use a combination of forms of location means to determine the location of the driver's eyes; and (g) the control means could include an error detection module the purpose of which is to detect possible inconsistencies in the form of improbable or impossible determinations of the position of the driver's eyes as computed by the location determination module, or desired mirror orientations which are not physically implementable by the positioning means.

It should therefore be understood that various modifications can be made to the preferred embodiments described and illustrated therein, without departing from the subject invention, the scope of which is defined in the appended claims.

I claim:

1. A method for operating a motor vehicle mirror system which automatically adjusts sideview mirrors based upon an adjustment of a central interior mirror, said method comprising:

orienting a movable central mirror for central rearview visibility by a motor vehicle driver seat occupant so that a desired central rearview light ray reflected from the central mirror is directed towards the eyes of the driver seat occupant and towards a pivot point behind the eyes about which the occupant's head pivots to view the central mirror and the sideview mirrors;

detecting the orientation of said central mirror;

generating orientation electrical signals indicative of the detected orientation of said movable central mirror;

utilizing said orientation electrical signals to determine a general location of the pivot point about which the occupant's head pivots to view the central mirror and the sideview mirrors;

generating control signals based upon the determined location of said pivot point of the occupant's head;

automatically orienting sideview mirrors for rearview visibility by the driver seat occupant at opposite sides of the motor vehicle based upon said control signals, said sideview mirrors being oriented to reflect prescribed sideview light rays toward said pivot point to enable side rearview vision of said light rays when the driver seat occupant's head is pivoted to view said sideview mirrors.

2. A method for operating a mirror system for a motor vehicle according to claim 1, further comprising the steps of:

detecting the approximate distance between said central mirror and said pivot point of the driver seat occupant's head;

generating electrical signals based upon the detected approximate distance between said central mirror and said pivot point of the driver seat occupant's head;

utilizing said electrical signals based upon the detected approximate distance between said central mirror and said pivot point of the driver seat occupant's head to derive said control signals.

3. A method for operating a mirror system for a motor vehicle according to claim 2, further comprising the steps of:

utilizing said orientation electrical signals indicative of the detected orientation of said movable central mirror to determine the direction of a vector normal to a surface of said central mirror;

utilizing i) a predetermined reflected sightline vector extending from a central point of the central mirror along a preselected optical path for central rearview visibility by the driver seat occupant, and ii) said vector normal to the surface of said central mirror, and iii) the detected approximate distance between said central mirror and said pivot point of the driver seat occupant's head to derive an approximate length and direction of a vector extending between said pivot point of the driver seat occupant's head and said central point of the central mirror so as to determine said approximate location of said pivot point of the driver seat occupant's head;

utilizing the determined approximate location of said pivot point of the driver seat occupant's head in accomplishing the step of automatically orienting said sideview mirrors for rearview visibility by the driver seat occupant at opposite sides of the motor vehicle.

4. A method for operating a mirror system for a motor vehicle according to claim 3, wherein the step of utilizing the determined approximate location of said pivot point of the driver seat occupant's head in accomplishing the step of automatically orienting said sideview mirrors comprises:

determining the approximate direction of vectors extending between said pivot point and a central point of each of said sideview mirrors; and utilizing i) said approximated vectors extending between said pivot point and a central point of each of said sideview mirrors, ii) predetermined reflected sightline vectors each respectively extending from a central point of one of said sideview mirrors along a preselected optical path for side rearview visibility by the driver seat occupant to derive respective vector directions normal to the respective surfaces of said sideview mirrors; and utilizing said vector directions normal to the respective surfaces of said sideview mirrors to derive said orientation of the sideview mirrors for rearview visibility by the driver seat occupant at opposite sides of the motor vehicle.

5. A method for operating a mirror system for a motor vehicle according to claim 1, further comprising the steps of:

utilizing said orientation electrical signals indicative of the detected orientation of said movable central mirror to determine the direction of a vector normal to a surface of said central mirror;

utilizing i) a predetermined reflected sightline vector extending from a central point of the central mirror along a preselected optical path for central rearview visibility by the driver seat occupant, and ii) said vector normal to the surface of said central mirror, and iii) an assumed lateral position of said pivot point of the driver seat occupant's head to derive an approximated length and direction of a vector extending between said pivot point of the driver seat occupant's head and said central point of the central mirror so as to determine the approximate location of said pivot point;

utilizing the determined approximate location of said pivot point in accomplishing the step of automatically orienting said sideview mirrors for rearview visibility by the driver seat occupant at opposite sides of the motor vehicle.

6. A method for operating a mirror system for a motor vehicle according to claim 5, wherein the step of utilizing the determined approximate location of said pivot point of the driver seat occupant's head in accomplishing the step of automatically orienting said sideview mirrors comprises:

determining an approximated direction of vectors extending between said pivot point of the driver's head and a central point of each of said sideview mirrors; and utilizing i) said vectors approximately extending between said pivot point and a central point of each of said sideview mirrors, and ii) predetermined reflected sightline vectors each respectively extending from a central point of one of said sideview mirrors along a preselected optical path for side rearview visibility by the driver seat occupant to derive respective vector directions normal to the respective surfaces of said sideview mirrors; and utilizing said vector directions normal to the respective surfaces of said sideview mirrors to derive said orientation of the sideview mirrors for rearview visibility by the driver seat occupant at opposite sides of the motor vehicle.

7. A method for operating mirror system for a motor vehicle comprising:

orienting a movable central mirror for optimal central rearview visibility by a driver seat vehicle occupant;

detecting the orientation of said central mirror;

generating electrical signals indicative of the detected orientation of said movable central mirror;

orienting a driver's sideview mirror disposed on the exterior driver's side of the motor vehicle for optimal rearview visibility by the driver at the driver's side of the vehicle;

detecting the orientation of said driver's sideview mirror;

generating electrical signals indicative of the detected orientation of said driver's sideview mirror;

utilizing said central mirror orientation electrical signals and said sideview mirror orientation electrical signals to determine a general location of the pivot point about which said occupant's head pivots to view said central mirror and said driver's side mirror:

generating control signals based upon the determined location of said pivot point of said occupant's head and automatically orienting said passenger's sideview mirror for rearview visibility by the driver seat occupant at said passenger's side of the motor vehicle based upon said control signals.

8. A motor vehicle mirror system for automatically adjusting sideview mirrors for prescribed side rearview visibility of a motor vehicle driver seat occupant based upon a adjustment of a central interior mirror, said mirror system comprising:

a central interior mirror constructed and arranged to be oriented by a motor vehicle driver seat occupant for central rearview visibility;

sideview mirrors disposed on opposite exterior sides of the motor vehicle and being adjustable for rearview visibility at opposite sides of the motor vehicle;

an orientation detector operatively connected with said central mirror and being constructed and arranged to detect the orientation of said central mirror and to generate electrical signals indicative of the detected orientation of said central mirror;

an electronic controller electrically connected with said orientation detector for utilizing (i) an assumed distance between a center point of the central mirror and an imaginary plane extending in a longitudinal direction with respect to the motor vehicle and passing through a single point within the driver seat occupant's head about which the occupant's head pivots to view said central mirror and said sideview mirrors, and (ii) said electrical signals generated by said orientation detector, to approximate a three dimensional location for said single point, said electronic controller generating controller output signals based upon said approximate three dimensional location of said single point; and electrically operated motor mechanisms each connected with a respective one of said sideview mirrors, said motor mechanisms being responsive to said controller output signals to orient said sideview mirrors for side rearview visibility by the driver seat occupant at opposite sides of the motor vehicle based upon said approximate location of said single point about which the driver seat occupant's head pivots, said motor mechanisms orienting said sideview mirrors to reflect prescribed side rearview light rays towards said single point within the driver seat occupant's head to enable side rearview vision of said light rays when the driver seat occupant's head is pivoted to view said sideview mirrors.

9. A mirror system as claimed in claim 8, wherein said imaginary plane extending in said longitudinal direction and passing through said single point within the driver seat occupant's head is assumed to be coincident with an imaginary plane extending in said longitudinal direction and passing through a center of the driver seat, so that said assumed distance is taken as a distance between the center point of the central mirror and the imaginary plane extending in said longitudinal direction and passing through the center of the driver seat.

10. A mirror system as claimed in claim 8, further comprising an activation switch for selectively enabling and disabling said electronic controller.

11. A mirror system as claimed in claim 9, wherein said electronic controller comprises a microcomputer having a microprocessor, a RAM memory, and a ROM memory.

12. A mirror system as claimed in claim 11, wherein the microprocessor comprises means for determining an angle formed between said prescribed rearview light rays and vectors between said single point and the center points of the respective sideview mirrors, and wherein said microprocessor generates said output signals based upon said angle.

* * * * *